(12) United States Patent
Hu et al.

(10) Patent No.: US 10,852,458 B2
(45) Date of Patent: Dec. 1, 2020

(54) CAMERA DEVICE

(71) Applicant: TDK TAIWAN CORP., Taoyuan (TW)

(72) Inventors: Chao-Chang Hu, Taoyuan (TW);
Chen-Hsien Fan, Taoyuan (TW);
Chih-Wei Weng, Taoyuan (TW)

(73) Assignee: TDK Taiwan Corp., Taoyuan (TW)

( * ) Notice: Subject to any disclaimer, the term of this patent is extended or adjusted under 35 U.S.C. 154(b) by 45 days.

(21) Appl. No.: 16/012,176

(22) Filed: Jun. 19, 2018

(65) Prior Publication Data

US 2018/0364399 A1 Dec. 20, 2018

Related U.S. Application Data

(60) Provisional application No. 62/521,645, filed on Jun. 19, 2017.

(30) Foreign Application Priority Data

Jun. 14, 2018 (CN) .......................... 2018 1 0612098

(51) Int. Cl.
| | | |
|---|---|---|
| G02B 1/06 | (2006.01) | |
| G02B 15/14 | (2006.01) | |
| G02B 7/02 | (2006.01) | |
| G02C 7/02 | (2006.01) | |
| G02B 3/14 | (2006.01) | |
| H04N 5/225 | (2006.01) | |
| G02B 13/00 | (2006.01) | |

(52) U.S. Cl.
CPC ............... G02B 3/14 (2013.01); G02B 7/023 (2013.01); G02B 13/0075 (2013.01); H04N 5/2253 (2013.01); H04N 5/2254 (2013.01)

(58) Field of Classification Search
CPC ...... G02B 3/0056; G02B 3/14; G02B 15/173; G02B 15/17; G02B 7/08; A45B 25/02; F04B 43/046; H01L 41/22; H01L 41/042; H01L 41/044; G11B 5/5552
USPC ....... 351/200, 205–206, 210, 218, 222, 246, 351/41, 159, 160 R, 161, 176; 359/819, 359/665–666, 676–677, 683, 824; 417/413.2; 29/25, 35; 310/311, 310/317–318; 360/294.4
See application file for complete search history.

(56) References Cited

U.S. PATENT DOCUMENTS

| | | | | |
|---|---|---|---|---|
| 2003/0169516 A1* | 9/2003 | Sekiyama | ............... | G02B 7/102 359/726 |
| 2007/0211349 A1* | 9/2007 | Chen | ........................ | G02B 3/14 359/666 |
| 2008/0144185 A1* | 6/2008 | Wang | ........................ | G02B 3/14 359/665 |

* cited by examiner

*Primary Examiner* — Dawayne Pinkney
(74) *Attorney, Agent, or Firm* — Muncy, Geissler, Olds & Lowe, P.C.x

(57) ABSTRACT

A camera device is provided, including a liquid lens, a deforming member, and a first driving module. The deforming member is disposed adjacent to the liquid lens, and the first driving module can generate relative motion between the liquid lens and the deforming member. In response to the adjustment of the distance between the liquid lens and the deforming member, the deforming member deforms the liquid lens.

17 Claims, 19 Drawing Sheets

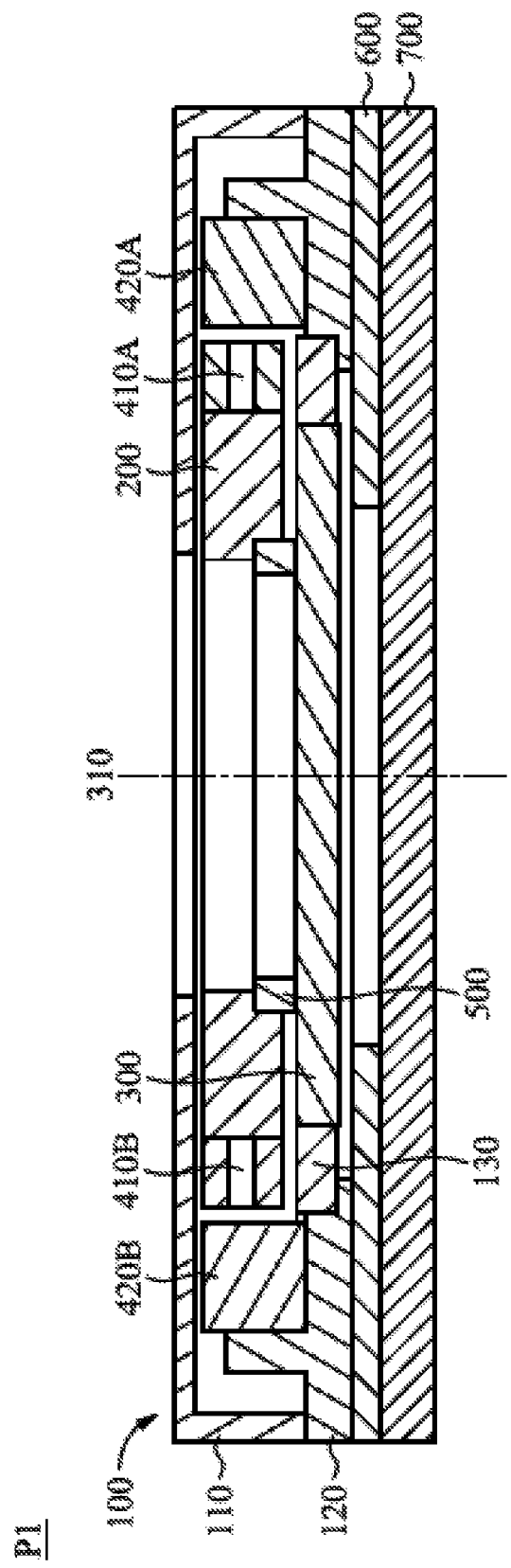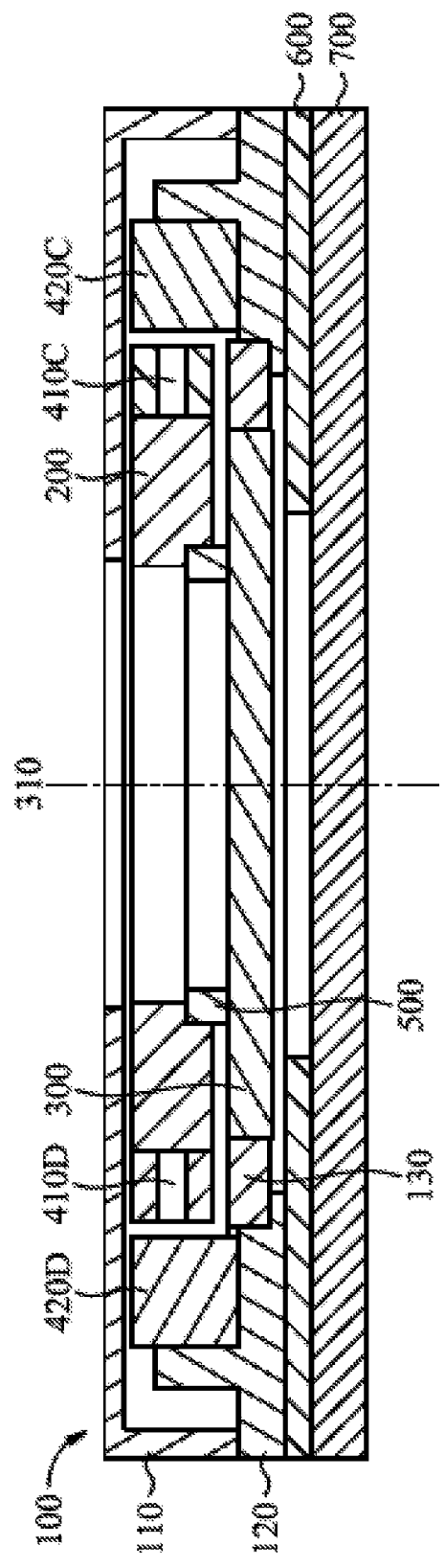
FIG. 4B
FIG. 4C

CAMERA DEVICE

CROSS REFERENCE TO RELATED APPLICATIONS

This application claims the benefit of U.S. Provisional Application No. 62/521,645, filed Jun. 19, 2017, and China Patent Application No. 201810612098.4 filed Jun. 14, 2018, the entirety of both of which are incorporated by reference herein.

BACKGROUND OF THE INVENTION

Field of the Invention

The application relates in general to a camera device, and in particular, to a camera device having a liquid lens.

Description of the Related Art

As technology has advanced, recent electronic devices (such as tablet computers and smartphones) usually include a lens module capable of aiding in photography or recording video. These electronic devices have become more commonplace, and have been developed to be more convenient and thin. More and more choices are provided for users to choose from.

However, an image may come out blurry if the user shakes the lens module in the electronic device. To improve image quality, it is increasingly important to design a shockproof zoom lens module.

BRIEF SUMMARY OF INVENTION

An embodiment of the invention provides a camera device, including a liquid lens, a deforming member, and a first driving module. The deforming member is disposed adjacent to the liquid lens, and the first driving module can generate relative motion between the liquid lens and the deforming member. In response to the adjustment of the distance between the liquid lens and the deforming member, the deforming member deforms the liquid lens.

In an embodiment, the deforming member has an annular structure, and the dimensions of the deforming member are less than the dimensions of the liquid lens. The camera device further comprises a fixed portion and a movable portion, and the first driving module comprises a first electromagnetic driving member and a second electromagnetic driving member corresponding to each other. The liquid lens is disposed on the fixed portion, and the first electromagnetic driving member and the second electromagnetic driving member are respectively disposed on the fixed portion and the movable portion.

In another embodiment, the lower surface of the deforming member is situated on a first plane, and the lower surface of the liquid lens is situated on a second plane, wherein the first driving module can drive the deforming member to rotate and make the first plane and the second plane interlace. The first driving module comprises at least two first electromagnetic driving members and at least two second electromagnetic driving members corresponding to the first electromagnetic driving members. The deforming member is disposed between the first electromagnetic driving members, and the first electromagnetic driving members are electrically independent.

In another embodiment, the first driving module can drive the deforming member to move along a direction that is perpendicular to the optical axis of the liquid lens relative to the liquid lens. The camera device further comprises a fixed portion and at least one suspension structure. The liquid lens is disposed on the fixed portion, and the suspension structure is connected to the fixed portion and the deforming member.

In another embodiment, the camera device further comprises a fixed portion and a second driving module, and the second driving module can drive the liquid lens to move along a direction that is perpendicular to the optical axis of the liquid lens relative to the fixed portion.

In some embodiments, the camera device further comprises a lens module, disposed above or below the liquid lens, and the deforming member can be formed on the lens module. In some embodiments, the camera device further comprises a reflective structure, and the liquid lens, the deforming member, and the first driving module are disposed on the reflective structure. For example, the liquid lens, the deforming member, and the first driving module can be disposed on a reflective surface of the reflective structure, or on a prism of the reflective structure. In some embodiments, the camera device further comprises another deforming member, and the deforming member and another deforming member are disposed on opposite sides of the liquid lens. The dimensions of the deforming member are different from the dimensions of another deforming member.

BRIEF DESCRIPTION OF DRAWINGS

The invention can be more fully understood by reading the subsequent detailed description and examples with references made to the accompanying drawings, wherein:

FIG. 4B is a cross-sectional view of the camera device according to another embodiment of the invention;

FIG. 4C is another cross-sectional view of the camera device according to another embodiment of the invention;

DETAILED DESCRIPTION OF INVENTION

The making and using of the embodiments of the camera device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
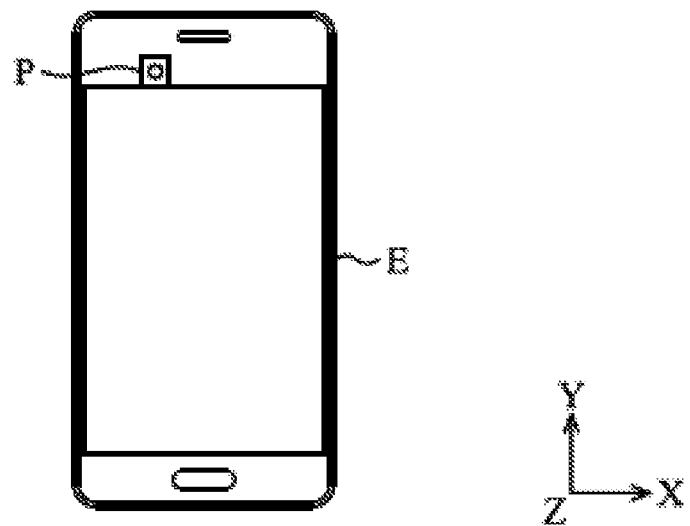
FIG. 1 is a schematic diagram of an electronic device according to an embodiment of the invention.

Referring to FIG. 1, in an embodiment of the invention, the camera device P can be disposed in an electronic device E and used to take photographs or record video. The electronic device E can be a smartphone or a digital camera, for example. When taking photographs or recording video, the camera device P can receive the light and form an image, wherein the image can be transmitted to a processor (not shown) in the electronic device E, where post-processing of the image can be performed.

Figure 2A:
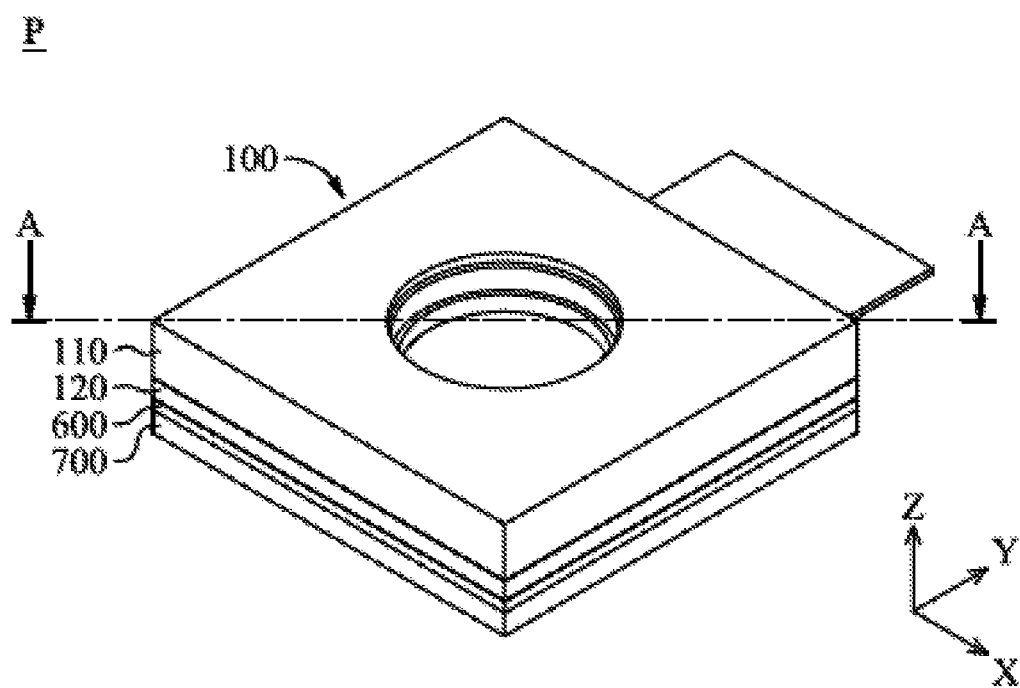
FIG. 2A is a schematic diagram of a camera device according to an embodiment of the invention.
Figure 2B:
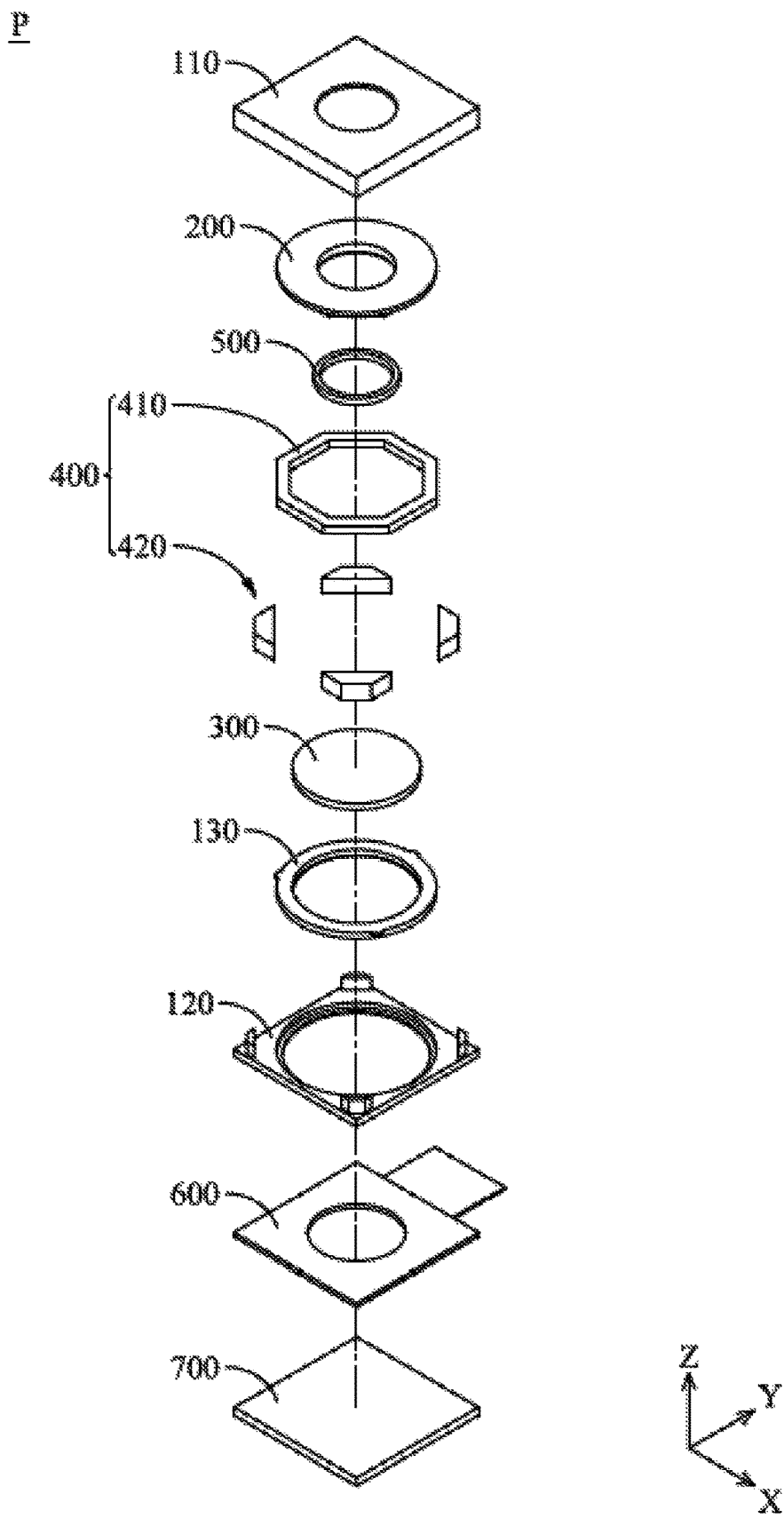
FIG. 2B is an exploded-view diagram of a camera device according to an embodiment of the invention.
Figure 2C:
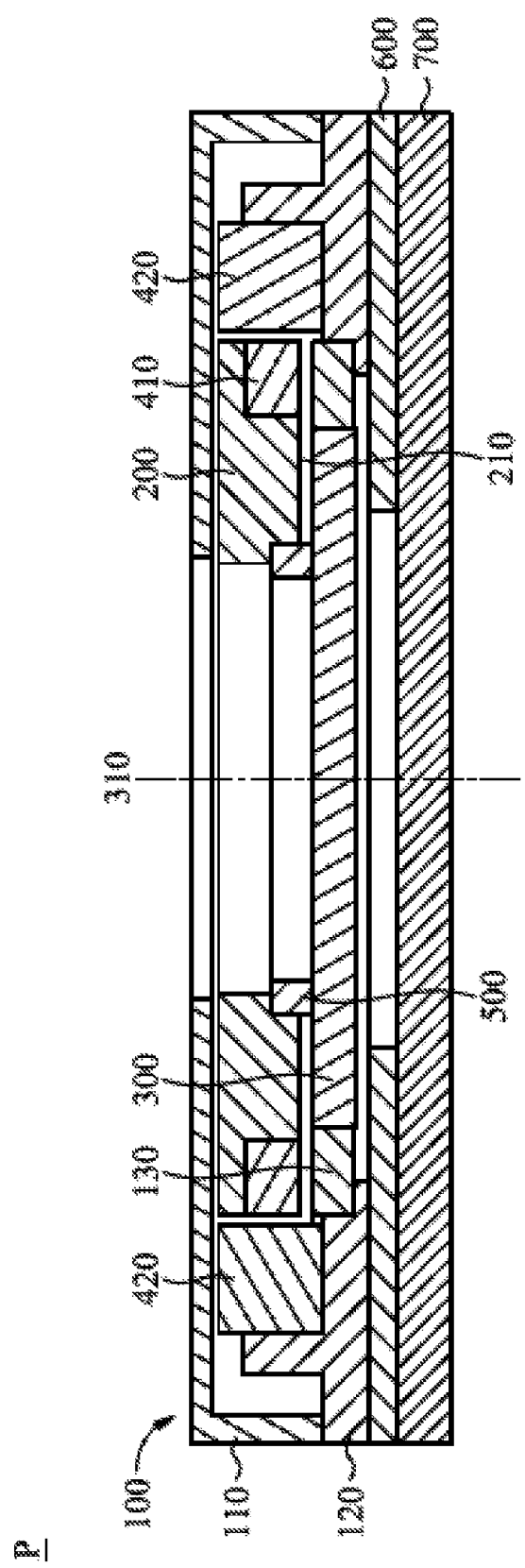
FIG. 2C is a cross-sectional view along line A-A in FIG. 2A.

FIG. 2A and is a schematic diagram of the camera device P, FIG. 2B is an exploded-view diagram of the camera device P, and FIG. 2C is a cross-sectional view along line A-A in FIG. 2A. Referring to FIGS. 2A-2C, the camera device P primarily comprises a fixed portion 100, a movable portion 200, a liquid lens 300, a first driving module 400, a deforming member 500, a circuit board 600, and an image sensor 700.

The fixed portion 100 comprises a housing 110, a bottom 120, and a lens holder 130, wherein the housing 110 and the bottom 120 can be assembled to form a hollow rectangular box, and the movable portion 200, the first driving module 400, and the deforming member 500 can be accommodated in the rectangular box. The lens holder 130 is disposed on the bottom 120, and can support the liquid lens 300.

The first driving module 400 can drive the movable portion 200 to move along an optical axis 310 of the liquid lens 300 relative to the fixed portion 100 and the image sensor 700. In particular, the first driving module 400 can comprise a first electromagnetic driving member 410 and at least one second electromagnetic driving member 420. For example, the first electromagnetic driving member 410 can be a driving coil affixed to the movable portion 200. The second electromagnetic driving member 420 can be affixed to the fixed portion 100. In this embodiment, the magnetic members (such as the magnets) disposed on four corners of the bottom 120 are the second electromagnetic driving members 420.

When a current flows through the driving coil (the first electromagnetic driving member 410), the electromagnetic effect is generated between the first electromagnetic driving member 410 and the second electromagnetic driving member 420, and provides a driving force to drive the movable portion 200 to move along the optical axis 310 of the liquid lens 300 relative to the fixed portion 100.

In this embodiment, the deforming member 500 is affixed to the movable portion 200 and has an annular structure. The position of the deforming member 500 corresponds to the liquid lens 300. Therefore, as the movable portion 200 is driven to move along the optical axis 310 of the liquid lens 300 relative to the fixed portion 100, the deforming member 500 can be also driven to move along the direction close to or away from the liquid lens 500. It should be noted that the deforming member 500 protrudes from the bottom surface 210 of the movable portion 200, and the dimensions (diameter) of the deforming member 500 is less than the dimensions (diameter) of the liquid lens 300.

As shown in FIGS. 2B and 2C, the circuit board 600 is disposed below the bottom 120, and the image sensor 700 is disposed below the circuit board 600. In other words, the lens holder 130 is disposed between the movable portion 200 and the circuit board 600, and the circuit board 600 is disposed between the bottom 120 and the image sensor 700. For example, the circuit board 600 can be a rigid flexible printed circuit board (RFPCB). The circuit board 600 can be electrically connected to the first driving module 400 for supplying power. Furthermore, the housing 110, the bottom 120, the movable portion 200, and the circuit board 600 all has opening aligned with the annular structure of the deforming member 500. The external light can pass these openings and reach the image sensor 700, so as to form an image on the image sensor 700.

Figure 3A:
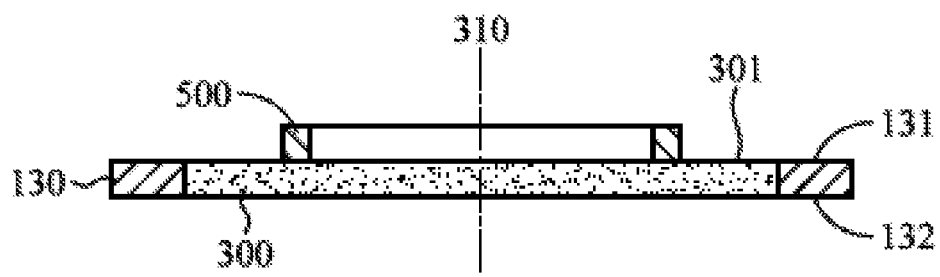
FIG. 3A is a schematic diagram of a deforming member in an initial position according to an embodiment of the invention.
Figure 3B:
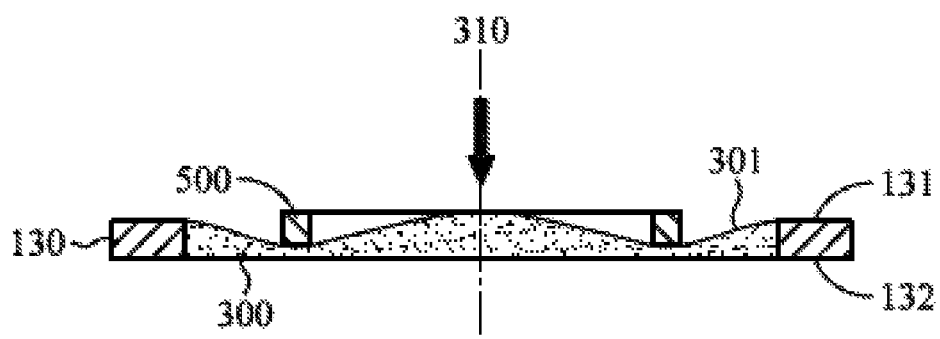
FIG. 3B is a schematic diagram representing the deforming member moves along an optical axis of a liquid lens according to an embodiment of the invention.

The method for adjusting the focus of the liquid lens 300 by the deforming member 500 is discussed below. Referring to FIG. 3A, in this embodiment, when the deforming member 500 is in an initial position, it contacts the upper surface 301 of the liquid lens 300, and the center of the deforming member 500 is aligned with the center of the liquid lens 300 (i.e. the optical axis 310 of the liquid lens 300). Subsequently, as shown in FIG. 3B, when the user desires to adjust the focus of the liquid lens 300, the first driving module 400 can drive the movable portion 200 to move toward the liquid lens 300 along the optical axis, and the deforming member 500 disposed on the movable portion 200 can also be driven. Since the deforming member 500 protrudes from the bottom surface 210 of the movable portion 200, the deforming member 500 can compress the upper surface 301 of the liquid lens 300 and deform the liquid lens 300. The focus of the liquid lens 300 can therefore be adjusted.

In some embodiments, the initial position of the deforming member 500 can be positioned to dispose at least a portion of the deforming member 500 between the top surface 13 and the bottom surface 132 of the lens holder 130. The upper surface 301 of the liquid lens 300 is compressed and curved. When the user desires to adjust the focus of the liquid lens 300, the first driving module 400 can drive the movable portion 200 to move away from the liquid lens 300 along the optical axis. The liquid lens 300 is then deformed and becomes flat (for example, the state of the liquid lens 300 can be changed from FIG. 3B to FIG. 3A).

In some embodiments, the camera device P can comprise a sensor for detecting the movement of the movable portion 200 and/or the deforming member 500. The aforementioned sensor can be a Hall sensor, a magnetoresistance effect sensor (MR sensor), a giant magnetoresistance effect sensor (GMR sensor), a tunneling magnetoresistance effect sensor (TMR sensor), an optical encoder, or an infrared sensor, for example.

Figure 4A:
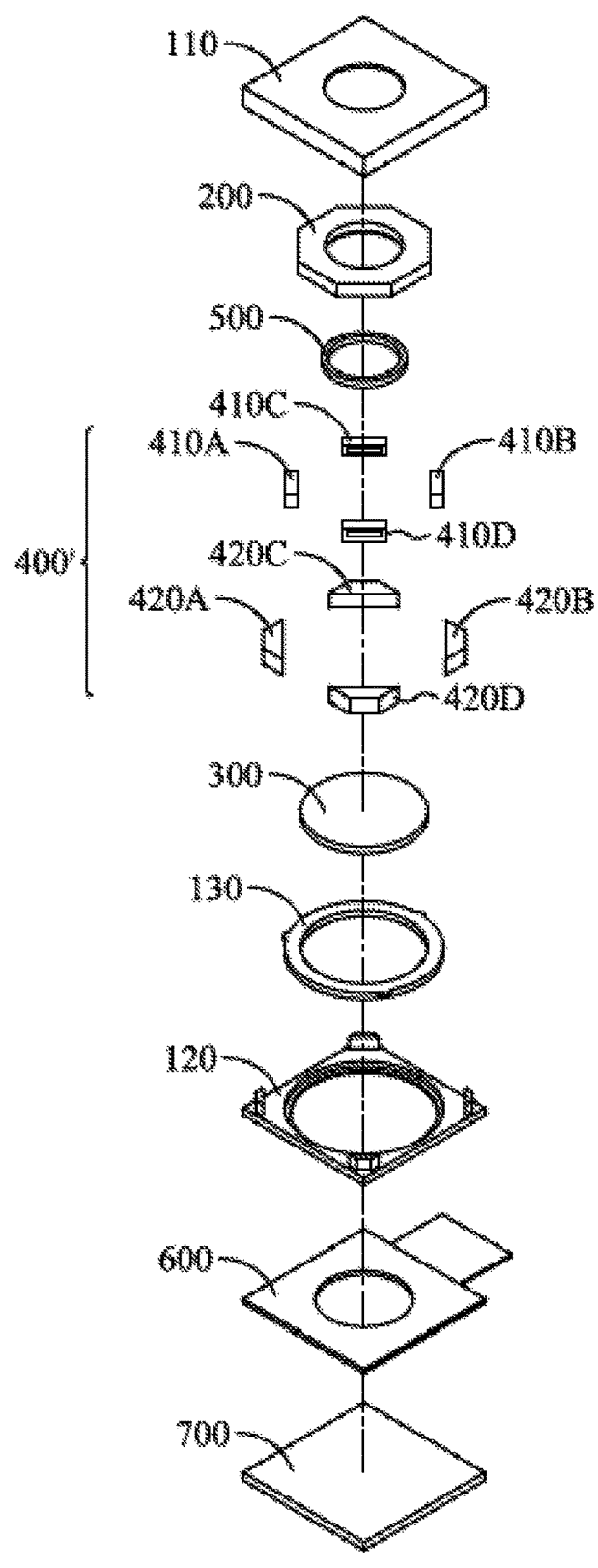
FIG. 4A is a schematic diagram of a camera device according to another embodiment of the invention.

Referring to FIGS. 4A, 4B, and 4C, in another embodiment, the camera device P1 comprises a fixed portion 100, a movable portion 200, a liquid lens 300, a first driving module 400', a deforming member 500, a circuit board 600, and an image sensor 700. The structures and the arrangements of the fixed portion 100, the movable portion 200, the liquid lens 300, the deforming member 500, the circuit board 600, and the image sensor 700 are the same as that of the fixed portion 100, the movable portion 200, the liquid lens 300, the deforming member 500, the circuit board 600, and the image sensor 700 in the camera device P, so that the features thereof are not repeated in the interest of brevity.

The first driving module 400' of the camera device P1 comprises four first electromagnetic driving members 410A, 410B, 410C, and 410D and four second electromagnetic driving members 420A, 420B, 420C, and 420D. Four second electromagnetic driving members 420A, 420B, 420C, and 420D can be respectively affixed to four corners of the bottom 120, and four first electromagnetic driving members 410A, 410B, 410C, and 410D can affixed to the movable portion 200 and respectively corresponds to the second electromagnetic driving members 420A, 420B, 420C, and 420D. As shown in FIGS. 4B and 4C, when the camera device P1 is assembled, the deforming member 500 is disposed between the first electromagnetic member 410A and the first electromagnetic member 410B. Similarly, the deforming member 500 is also disposed between the first electromagnetic member 410C and the first electromagnetic member 410D.

In this embodiment, the first electromagnetic driving members 410A, 410B, 410C, and 410D can be driving coils, and the second electromagnetic driving members 420A, 420B, 420C, and 420D can be magnetic members (such as magnets). It should be noted that the first electromagnetic driving members 410A, 410B, 410C, and 410D are electrically independent.

Figure 5A:
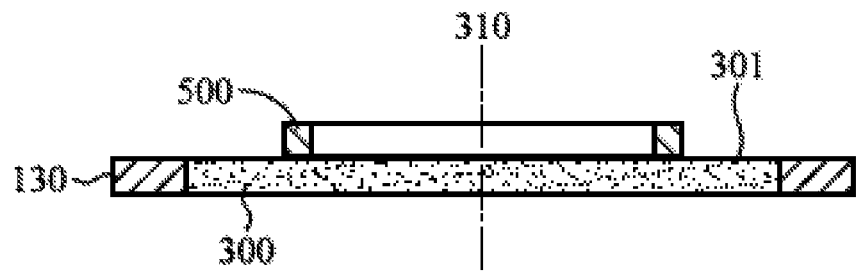
FIG. 5A is a schematic diagram of a deforming member in an initial position according to another embodiment of the invention.

Owing to the aforementioned structures, the camera device P1 can achieve the purposes of focus adjustment and image stabilization. Referring to FIG. 5A, when the deforming member 500 is in an initial position, it contacts the upper surface 301 of the liquid lens 300, and the center of the deforming member 500 is aligned with the center of the liquid lens 300.

Figure 5B:
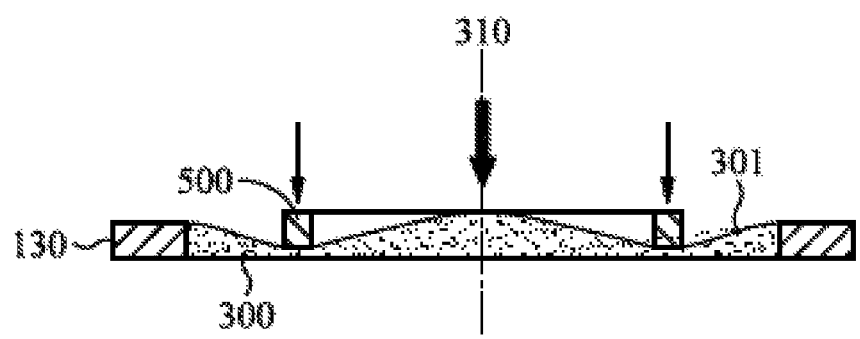
FIG. 5B is a schematic diagram representing the deforming member moves along an optical axis of a liquid lens according to another embodiment of the invention.

Referring to FIG. 5B, when same current flows through the first electromagnetic driving members on opposite sides of the deforming member 500 (such as the first electromagnetic driving members 410A and 410B and/or the first electromagnetic driving members 410C and 410D), the same driving force can be provided to opposite sides of the deforming member 500. The deforming member 500 can move along the optical axis 310 and compress the upper surface 301 of the liquid lens 300. The liquid lens 300 is therefore deformed, and the focus of the liquid lens 300 can be adjusted.

Figure 5C:
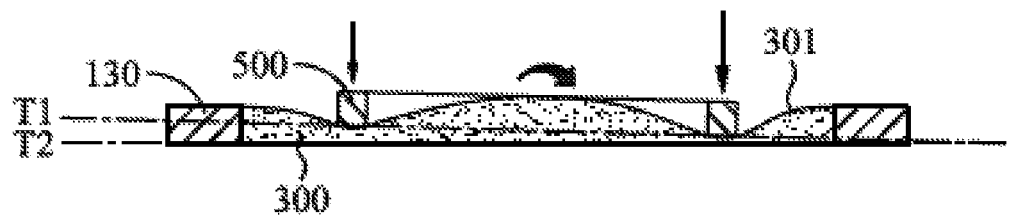
FIG. 5C is a schematic diagram representing the deforming member rotates relative to a lens holder according to another embodiment of the invention.

Referring to FIG. 5C, when different currents flow through the first electromagnetic driving members on opposite sides of the deforming member 500 (such as the first electromagnetic driving members 410A and 410B or the first electromagnetic driving members 410C and 410D), the different driving forces can be provided to the opposite sides of the deforming member 500. Therefore, the deforming member 500 can rotate around a rotation axis perpendicular to the optical axis 310, and deform the liquid lens 300.

In detail, the lower surface of the deforming member 500 is situated on a first plane T1, and the lower surface 302 of the liquid lens 300 is situated on a second plane T2. When the first driving module 400' drives the deforming member 500 to rotate around the rotation axis, the first plane T1 and the second plane T2 are interlaced. The position of the focus of the liquid lens 300 on the XY-plane can be adjusted, so as to achieve the purpose of image stabilization.

Figure 6A:
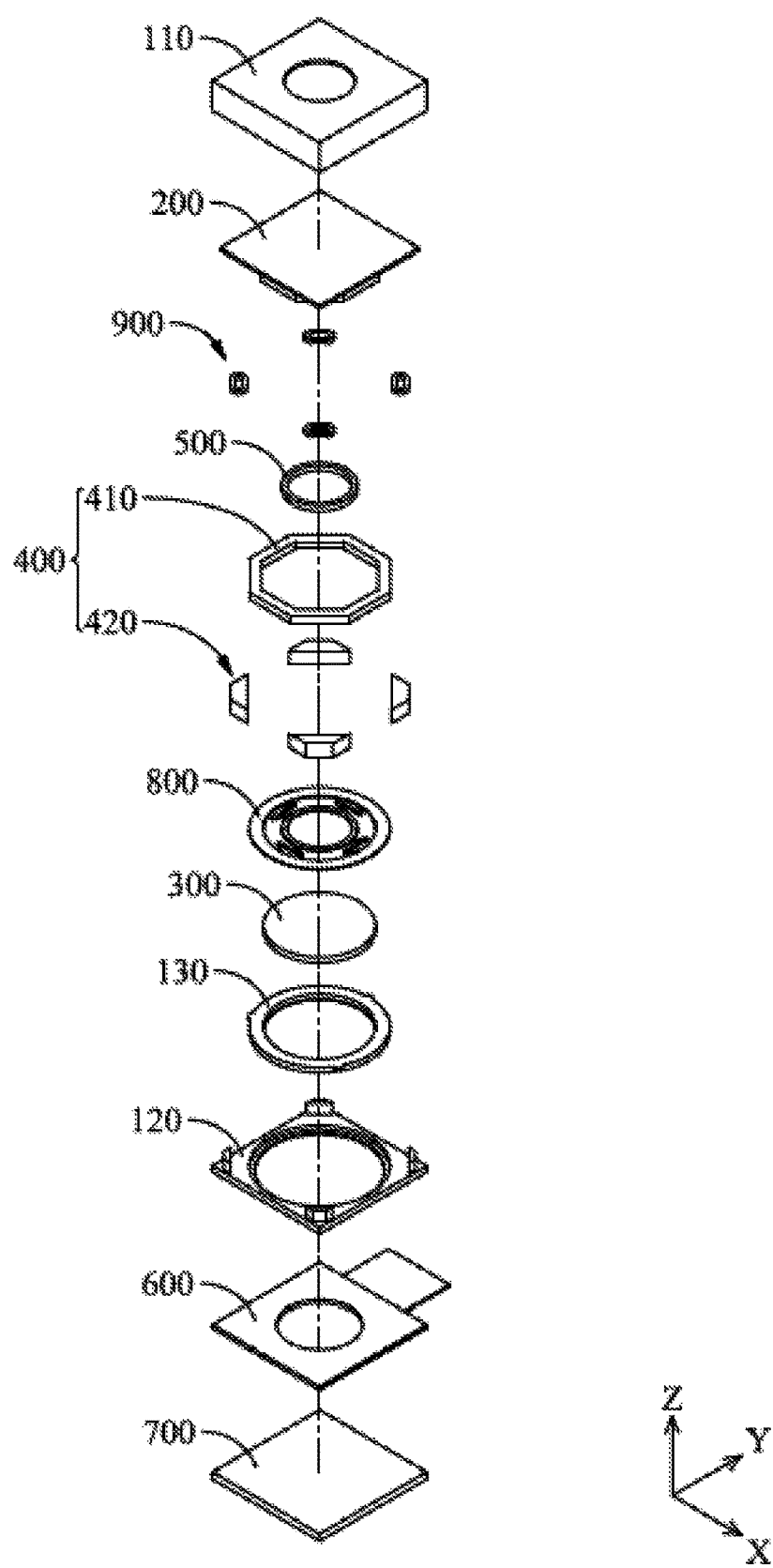
FIG. 6A is a schematic diagram of a camera device according to another embodiment of the invention.
Figure 6B:
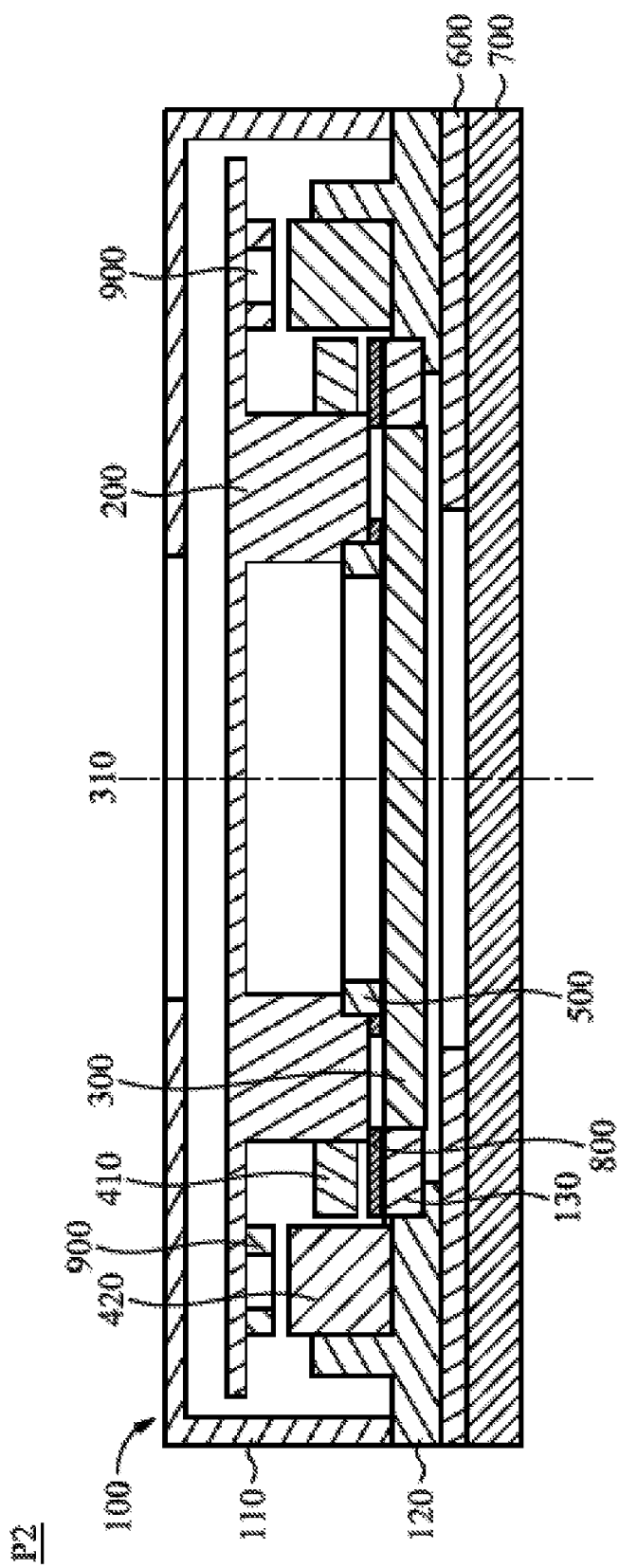
FIG. 6B is a cross-sectional view of the camera device according to another embodiment of the invention.

Referring to FIGS. 6A and 6B, in another embodiment, the camera device P2 comprises a fixed portion 100, a movable portion 200, a liquid lens 300, a first driving module 400, a deforming member 500, a circuit board 600, an image sensor 700, a suspension structure 800, and a second driving module 900. The structures and the arrangements of the fixed portion 100, the movable portion 200, the liquid lens 300, the first driving module 400, the deforming member 500, the circuit board 600, and the image sensor 700 are the same as that of the fixed portion 100, the movable portion 200, the liquid lens 300, the first driving module 400, the deforming member 500, the circuit board 600, and the image sensor 700 in the camera device P, so that the features thereof are not repeated in the interest of brevity.

The suspension structure 800 is connected to the deforming member 500 and the lens holder 130, and provides an elastic force to the deforming member 500 to maintain the deforming member 500 on its initial position. The second driving module 900 comprises a plurality of driving coils affixed to the movable portion 200. The difference between the first electromagnetic driving member 410 of the first driving module 400 and the second driving module 900 is in that, the first electromagnetic driving member 410 is disposed between the deforming member 500 and the second electromagnetic driving member 420, and the second electromagnetic driving member 420 is disposed between the bottom 120 and the coils of the second driving module 800.

Figure 7A:
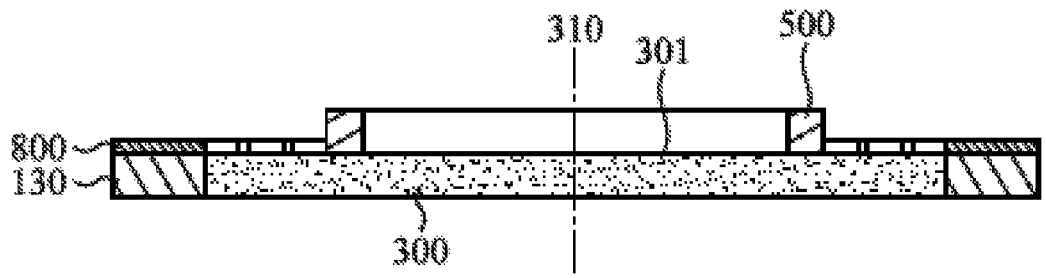
FIG. 7A is a schematic diagram of a deforming member in an initial position according to another embodiment of the invention.

The camera device P2 can achieve the purposes of focus adjustment and image stabilization. Referring to FIG. 7A, when the deforming member 500 is in the initial position, it contacts the upper surface 301 of the liquid lens 300, and the center of the deforming member 500 is aligned with the center of the liquid lens 300.

Figure 7B:
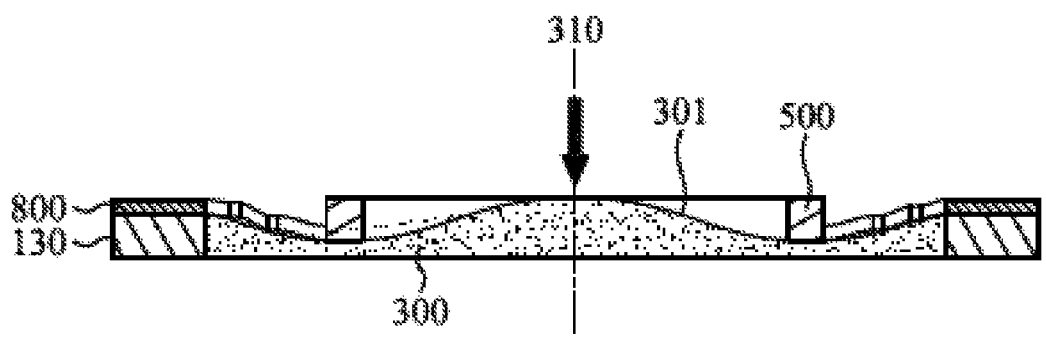
FIG. 7B is a schematic diagram representing the deforming member moves along an optical axis of a liquid lens according to another embodiment of the invention.

Referring to FIG. 7B, when a current flows through the first electromagnetic driving member 410, the electromagnetic effect is generated between the first electromagnetic driving member 410 and the second electromagnetic driving member 420, and drives the deforming member 500 to move along the optical axis 310. The deforming member 500 can compress the upper surface 301 of the liquid lens 300 and deform the liquid lens 300. The focus of the liquid lens 300 can therefore be adjusted.

Figure 7C:
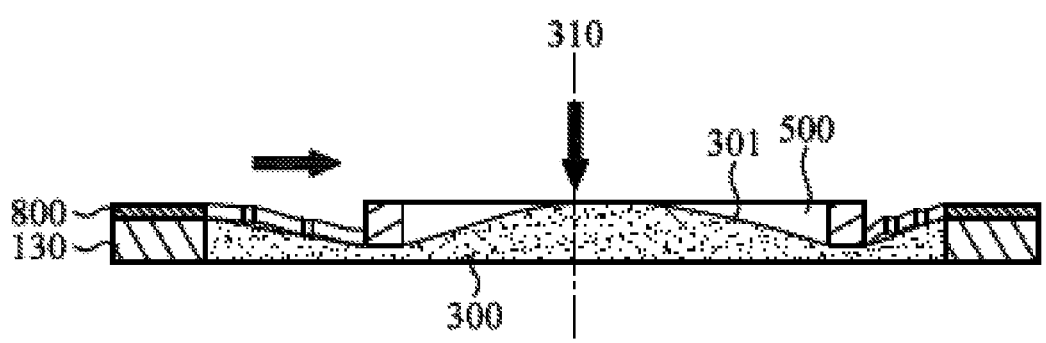
FIG. 7C is a schematic diagram representing the deforming member moves along a direction that is perpendicular to the optical axis of a liquid lens according to another embodiment of the invention.

Referring to FIG. 7C, when a current flows through the second driving module 900, the electromagnetic effect is generated between the second driving module 900 and the second electromagnetic driving member 420, and drives the deforming member 500 to move along a direction that is perpendicular to the optical axis 310. The position of the focus of the liquid lens 300 on the XY-plane can be adjusted, so as to achieve the purpose of image stabilization.

Moreover, when the current does not flow through the second driving module 900, the elastic force of the suspension structure 800 pushes the deforming member 500 to move to its initial position. In this embodiment, the suspension structure is a spring.

Figure 8:
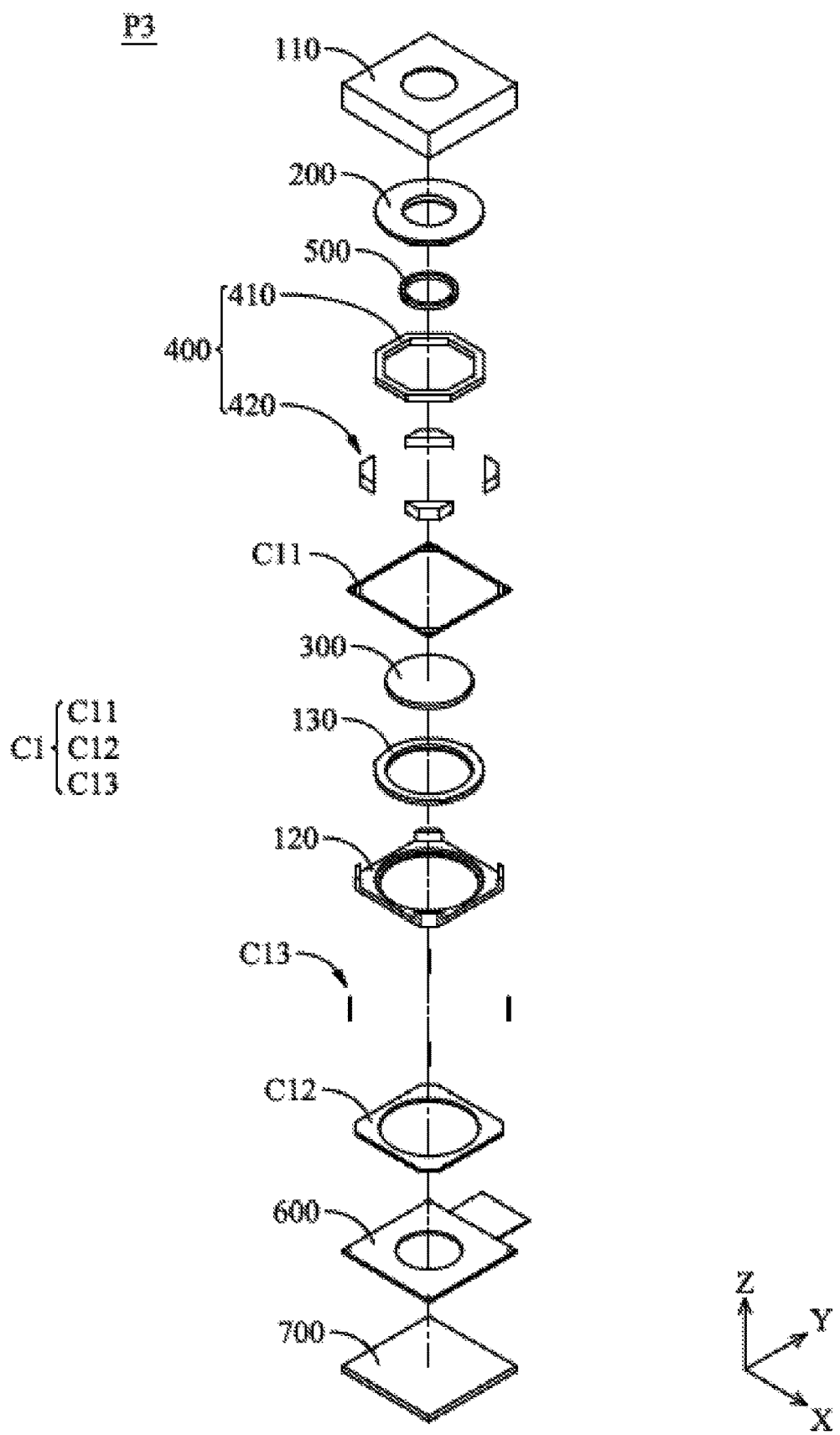
FIG. 8 is a schematic diagram of a camera device according to another embodiment of the invention.

In some embodiments, the camera device can further comprise a structure for moving the liquid lens along a direction that is perpendicular to the optical axis 310, so as to achieve the purpose of image stabilization. Referring to FIG. 8, in another embodiment, the camera device P3 comprises a fixed portion 100, a movable portion 200, a liquid lens 300, a first driving module 400, a deforming member 500, a circuit board 600, an image sensor 700, and a compensation structure C1. The structures and the arrangements of the movable portion 200, the liquid lens 300, the first driving module 400, the deforming member 500, the circuit board 600, and the image sensor 700 are the same as that of the movable portion 200, the liquid lens 300, the first driving module 400, the deforming member 500, the circuit board 600, and the image sensor 700 in the camera device P, so that the features thereof are not repeated in the interest of brevity.

The fixed portion 100 comprises a housing 110, a bottom 120, and a lens holder 130. The compensation structure C1 comprises an elastic member C11, a coil board C12, and a plurality of suspension wires C13. The elastic member C11 is connected to the bottom 120 and the lens holder 130, so as to hang the lens holder 130 on the bottom 120. The coil board C12 is affixed to the circuit board 600. The suspension wires C13 are connected to the circuit board 600 and the elastic member C11.

When a current flows through the coil board C12, the electromagnetic effect is generated between the coil board C12 and the second electromagnetic driving member 420 of the first driving module 400, and provides an electromagnetic force to drive the lens holder 130 and the liquid lens 300 disposed thereon to move along a direction that is perpendicular to the optical axis 310 of the liquid lens 300 relative to the bottom 120.

Figure 9A:
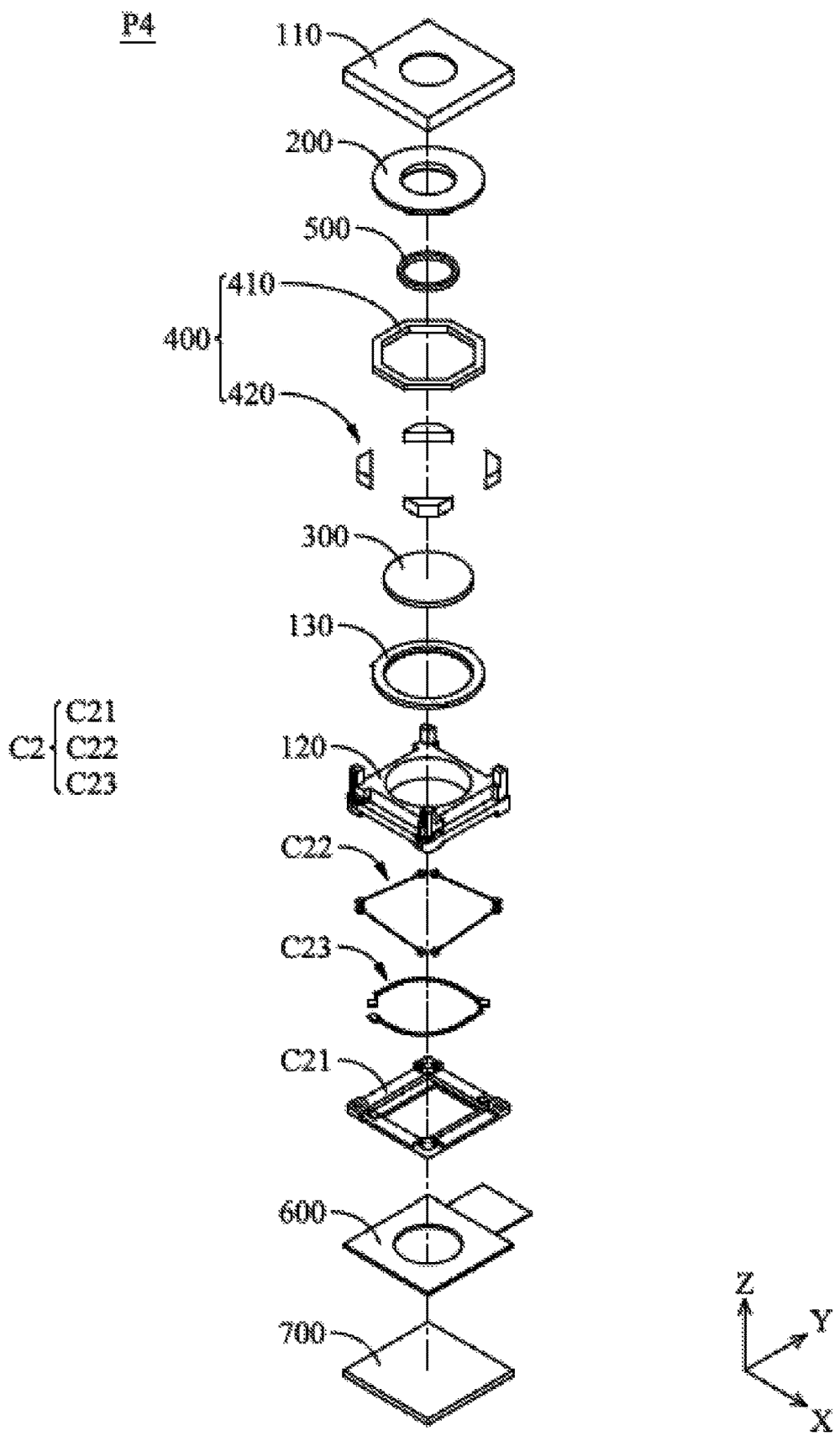
FIG. 9A is a schematic diagram of a camera device according to another embodiment of the invention.

Referring to FIG. 9A, in another embodiment, the camera device P4 comprises a fixed portion 100, a movable portion 200, a liquid lens 300, a first driving module 400, a deforming member 500, a circuit board 600, an image sensor 700, and a compensation structure C2. The structures and the arrangements of the fixed portion 100, the movable portion 200, the liquid lens 300, the first driving module 400, the deforming member 500, the circuit board 600, and the image sensor 700 are the same as that of the fixed portion 100, the movable portion 200, the liquid lens 300, the first driving module 400, the deforming member 500, the circuit board 600, and the image sensor 700 in the camera device P, so that the features thereof are not repeated in the interest of brevity.

Figure 9B:
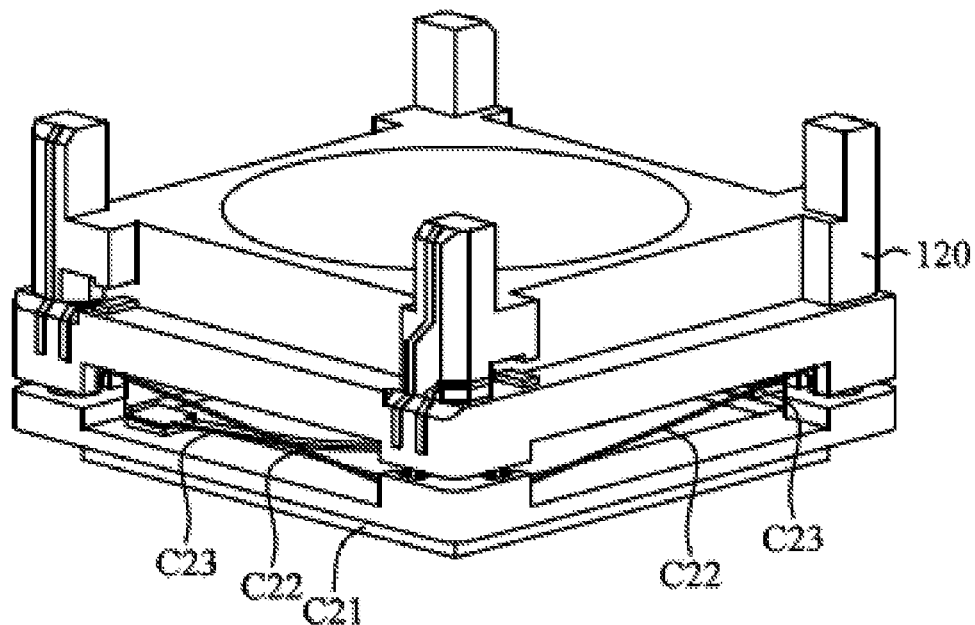
FIG. 9B is a schematic diagram of a bottom and a compensation structure according to another embodiment of the invention.
Figure 9C:
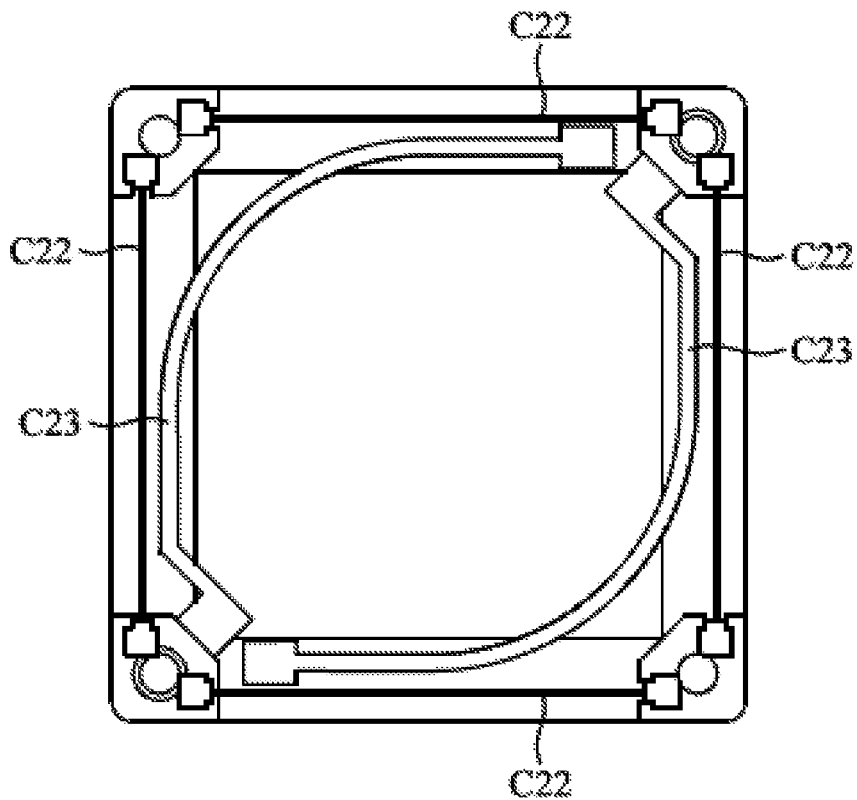
FIG. 9C is a top view of a bottom and a compensation structure according to another embodiment of the invention.

The compensation structure C2 is disposed between the image sensor 700 and the bottom 120, and comprises a base C21, a plurality of biasing members C22, and a plurality of elastic members C23. The base C21 and the image sensor 700 are affixed to the case of the electronic device E, and the bottom 120 is connected to the base C21 via the biasing members C22 and the elastic members C23. Referring to FIGS. 9B and 9C, in this embodiment, the compensation structure C2 comprises four biasing members C22, respectively disposed on the different sides of the base C21. The opposite ends of each of the biasing members C22 respectively affixed to the base C21 and the bottom 120 (for example, by an engaging means or an adhesive). The opposite ends of each of the elastic members C23 also respectively affixed to the base C21 and the bottom 120.

The biasing members C22 can be wires comprising a shape-memory alloy (SMA), and their lengths can be changed by applying one or more driving signals (e.g., electrical current) from an external power source (not shown) to them. For example, when applying driving signals to heat the biasing members C22, the biasing elements C22 are able to deform (e.g., elongated or shortened). When the application of the driving signals is stopped, the deformed biasing members C22 will recover to their original lengths. In other words, by applying one or more appropriate driving signals, the lengths of the biasing members C22 can be controlled to move the bottom 120 and the liquid lens 300 relative to the base C21. The purpose of image stabilization can be achieved. In addition, since the base C21 and the bottom 120 are also connected through the elastic members C23, when the drive signals is not applied to the biasing members C22, the bottom 120 and the liquid lens 300 can be positioned at a predetermined position with respect to the base C21 by the elastic forces of the elastic members C23.

The biasing member C22, for example, can comprise a titanium-nickel (TiNi) alloy, a titanium-palladium (TiPd) alloy, a titanium-nickel (TiNiCu) alloy, a titanium-nickel-palladium (TiNiPd) alloy, or a combination thereof.

In some embodiments, the first electromagnetic driving member in the camera device can be a magnetic member, and the second electromagnetic driving member can be a driving coil. In some embodiments, the second electromagnetic driving member is a driving coil, and the deforming member comprises magnetic material. Therefore, the electromagnetic effect can be generated between the second electromagnetic driving member 410 and the deforming member to move the deforming member. The movable portion and the first electromagnetic driving member can be omitted, and the camera device can be miniaturized.

In the following description, the liquid lens 300 and the members for deforming and/or moving liquid lens 300 (comprising the fixed portion 100, the movable portion 200, the first driving module 400, the deforming member 500, the circuit board 600, the suspension structure 800, the second driving module 900, the compensation structure C1, and/or the compensation structure C2) are defined as an optical structure O.

Figure 10A:
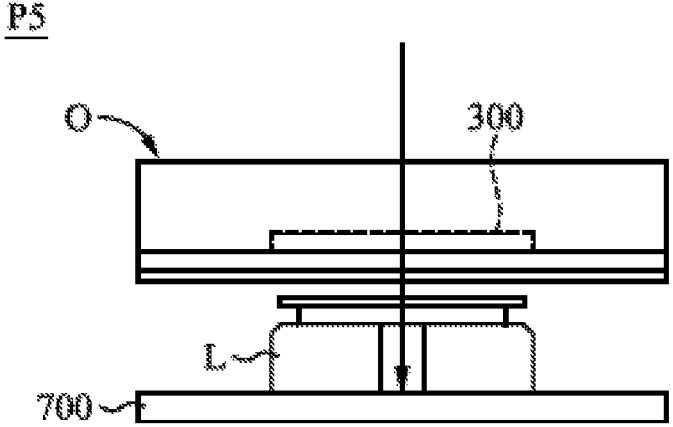
FIG. 10A is a schematic diagram of a camera device according to another embodiment of the invention.
Figure 10B:
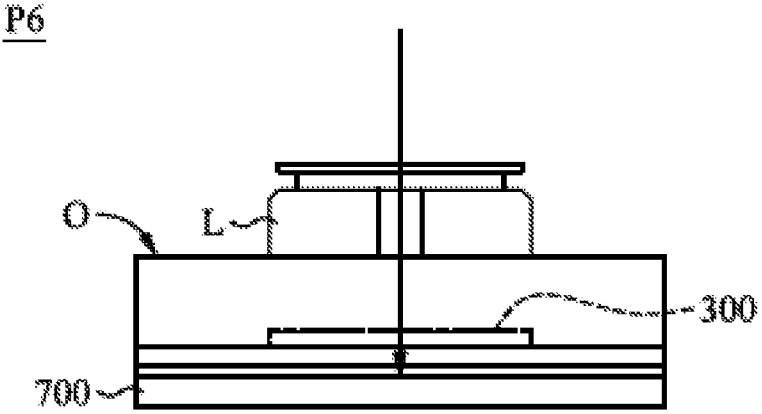
FIG. 10B is a schematic diagram of a camera device according to another embodiment of the invention.

As shown in FIG. 10A, in some embodiments, the camera device P5 can comprise an optical structure O, a lens module L, and an image sensor 700. The lens module L can be a camera lens having one or more optical lenses, and disposed below the liquid lens 300 and between the liquid lens 300 and the image sensor 700. As shown in FIG. 10B, in the camera device P6 comprising an optical structure O, a lens module L, and an image sensor 700, the lens module L is disposed above the liquid lens 300. That is, the liquid lens 300 is disposed between the lens module L and the image sensor 700.

In some embodiments, the lens module L can be used as the deforming member 500. In other words, the deforming member 500 can be replaced by the lens module L, and the lens module L can be disposed at the position of the aforementioned deforming member 500.

Figure 11A:
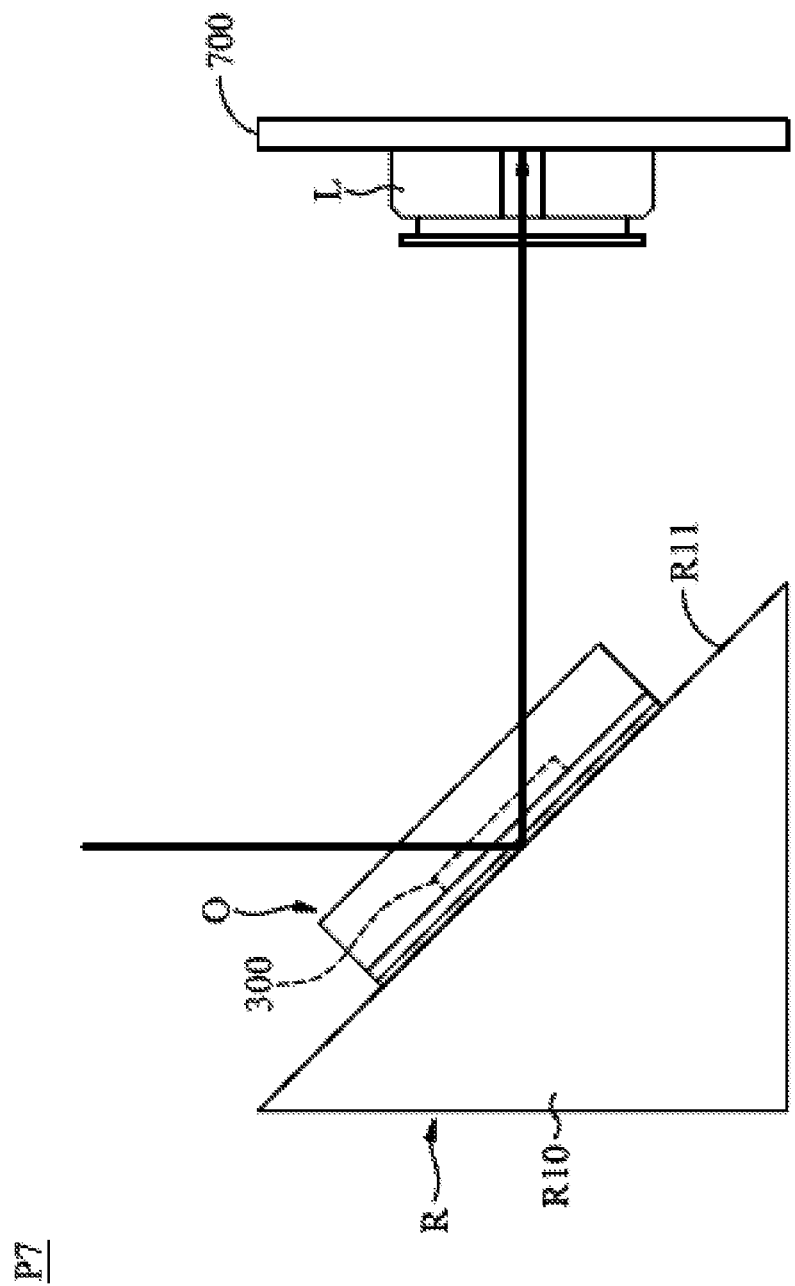
FIG. 11A is a schematic diagram of a camera device according to another embodiment of the invention.

Referring to FIG. 11A, in another embodiment, the camera device P7 comprises an optical structure O, a reflective structure R, a lens module L, and an image sensor 700. The reflective structure R comprises a reflective mirror R10. The optical structure O can be disposed on a reflective surface R11 of the reflective mirror R10. The external light can pass the optical structure O and be reflected by the reflective structure R, and finally reach the image sensor 700 through the lens module L.

Figure 11B:
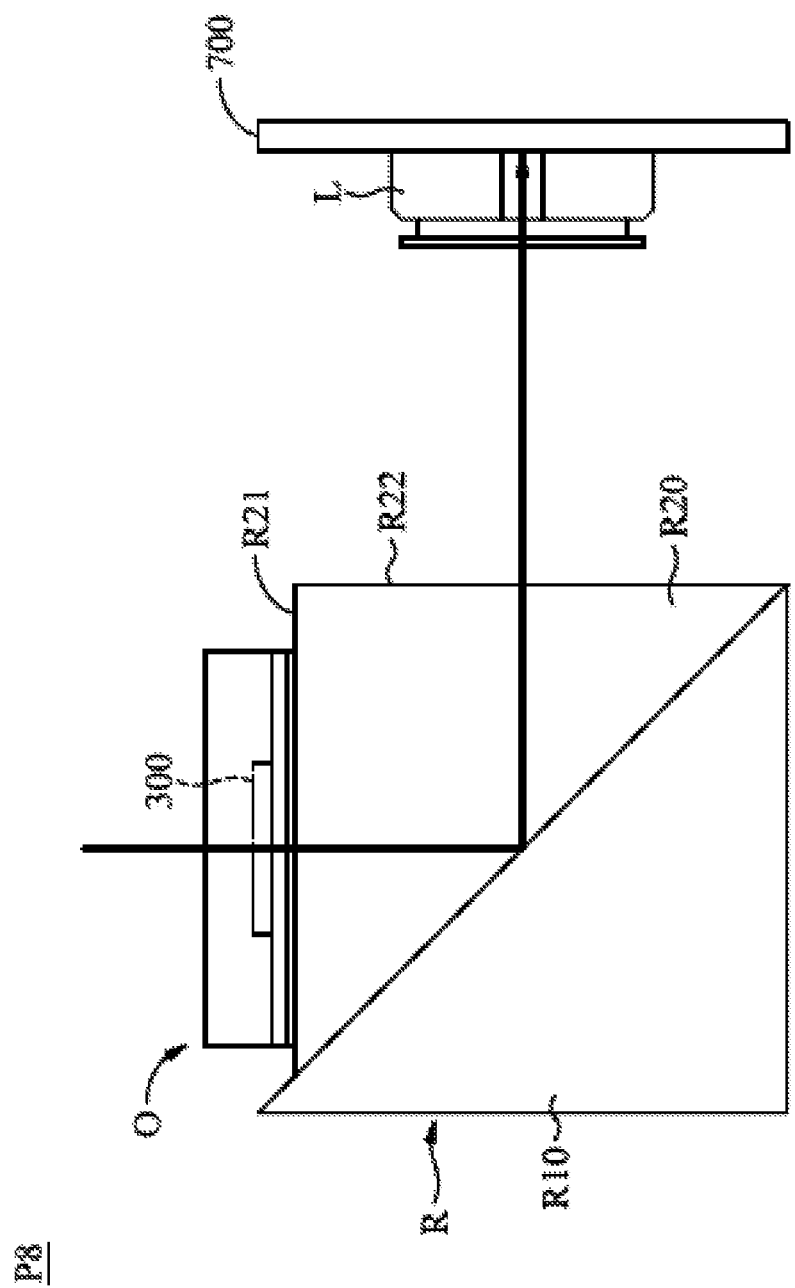
FIG. 11B is a schematic diagram of a camera device according to another embodiment of the invention.
Figure 11C:
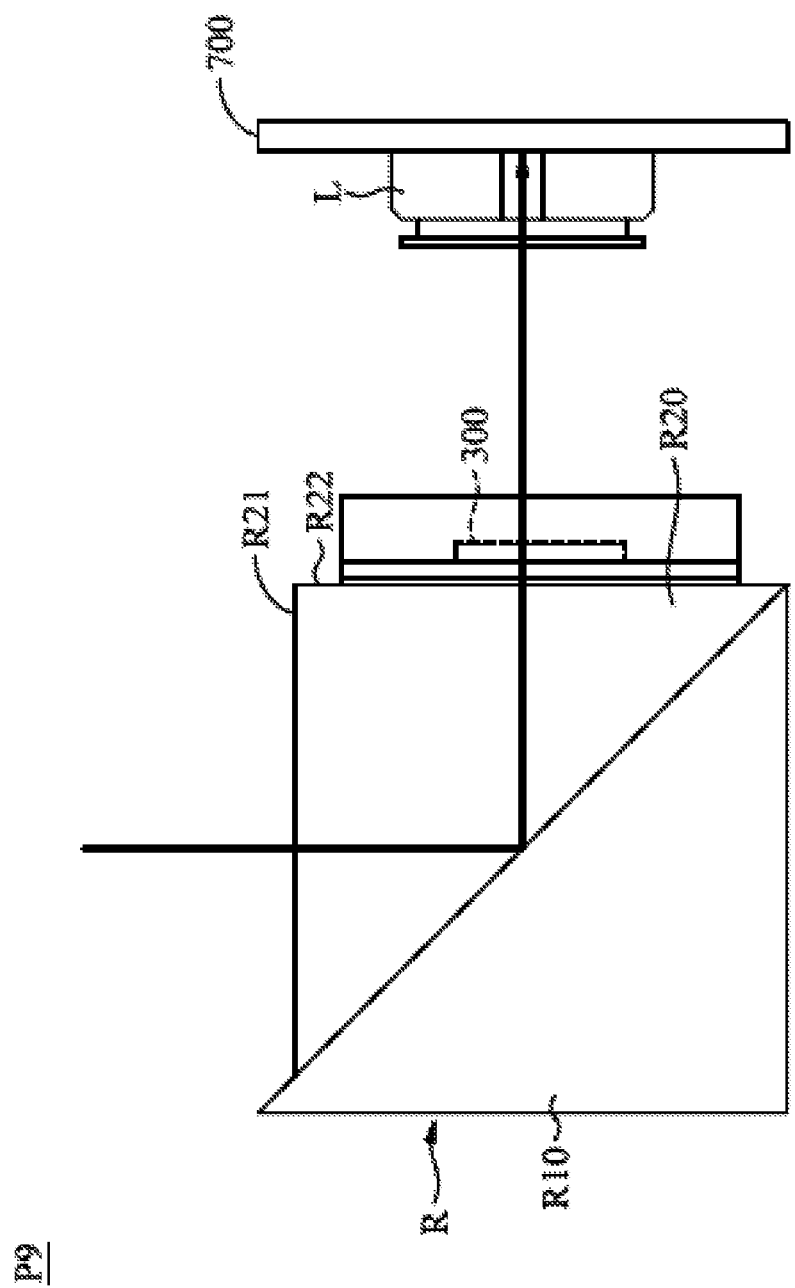
FIG. 11C is a schematic diagram of a camera device according to another embodiment of the invention.

Referring to FIGS. 11B and 11C, in some embodiments, the reflective structure R further comprises a prism R20, and the optical structure O can be disposed on the light entering surface R21 (such as the camera device P8 shown in FIG. 11B) or the light emitting surface R22 (such as the camera device P9 shown in FIG. 11C) of the prism R20.

Figure 12:
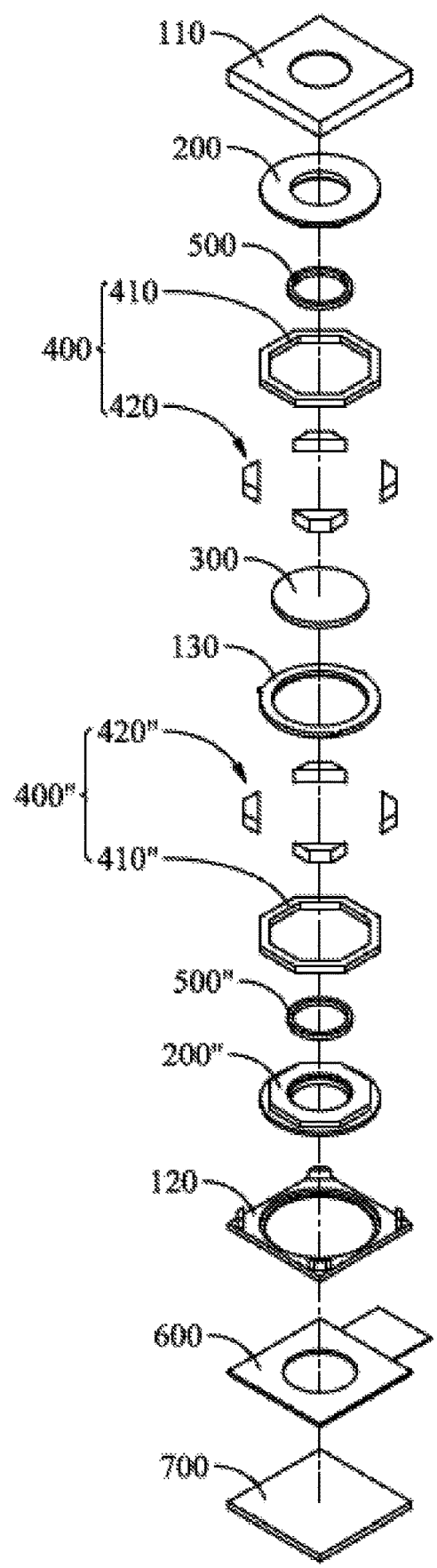
FIG. 12 is a schematic diagram of a camera device according to another embodiment of the invention.

Referring to FIG. 12, in another embodiment, the camera device P10 comprises a fixed portion 100, a movable portion 200, another movable portion 200", a liquid lens 300, a first driving module 400, another first driving module 400", a deforming member 500, another deforming member 500", a circuit board 600, an image sensor 700, a suspension structure 800, and a second driving module 900. The structures and the arrangements of the fixed portion 100, the movable portion 200, the liquid lens 300, the first driving module 400, the deforming member 500, the circuit board 600, and the image sensor 700 are the same as that of the fixed portion 100, the movable portion 200, the liquid lens 300, the first driving module 400, the deforming member 500, the circuit board 600, and the image sensor 700 in the camera device P, so that the features thereof are not repeated in the interest of brevity.

The liquid lens 300 is disposed between the deforming member 500 and the deforming member 500", and the deforming member 500" is affixed to the movable portion 200". The first driving module 400" comprises a first electromagnetic driving member 410" and at least one second electromagnetic driving member 420". For example, the first electromagnetic driving member 410" can be a driving coil affixed to the movable portion 200", and the second electromagnetic driving member 420" can be a magnetic member (such as a magnet) affixed to the fixed portion 100. When a current flows through the first electromagnetic driving member 410", the electromagnetic effect is generated between the first electromagnetic driving member 410" and the second electromagnetic driving member 420", and provides a driving force to drive the movable portion 200" and the deforming member 500" to move along the optical axis 310 of the liquid lens 300 relative to the fixed portion 100.

Figure 13A:
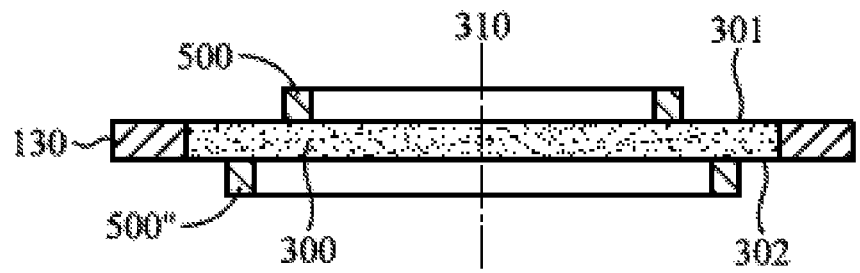
FIG. 13A is a schematic diagram of a deforming member and another deforming member in an initial position according to another embodiment of the invention.
Figure 13B:
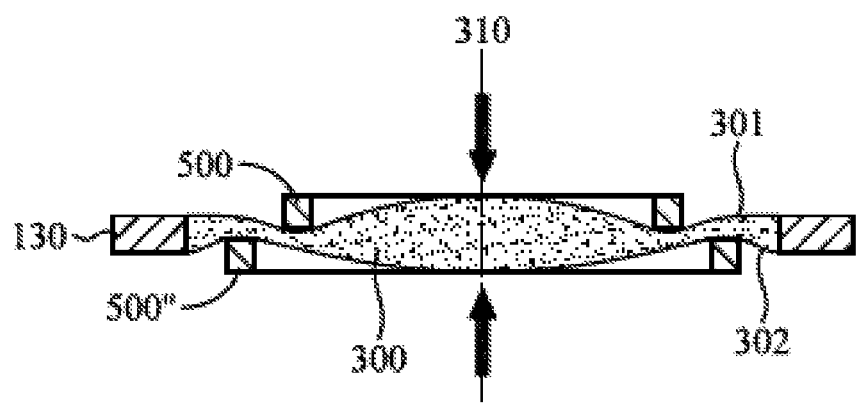
FIG. 13B is a schematic diagram representing the deforming member and another deforming member move along an optical axis of a liquid lens according to another embodiment of the invention.

As shown in FIGS. 13A and 13B, since the deforming member 500 and the deforming member 500" are disposed on the opposite surfaces of the liquid lens, they can respectively compress the upper surface 301 and lower surface 302 of the liquid lens 300 when moving. In this embodiment, the dimensions of the deforming member 500 are different from that of the deforming member 500", so as to facilitate the focus adjustment of the liquid lens 300. In some embodiments, the dimensions of the deforming member 500 are substantially the same as that of the deforming member 500".

In summary, a camera device is provided, including a liquid lens, a deforming member, and a first driving module. The deforming member is disposed adjacent to the liquid lens, and the first driving module can generate relative motion between the liquid lens and the deforming member. In response to the adjustment of the distance between the liquid lens and the deforming member, the deforming member deforms the liquid lens.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A camera device, comprising:
   a liquid lens;
   a deforming member, disposed adjacent to the liquid lens and configured to deform the liquid lens; and
   a first driving module, configured to drive the liquid lens or the deforming member to move along an optical axis of the liquid lens, and comprising a first electromagnetic driving member and a second electromagnetic driving member corresponding to each other, wherein in response to the adjustment of the distance between the liquid lens and the deforming member, the deforming member deforms the liquid lens, wherein the first electromagnetic driving member and the second electromagnetic driving member are separated and not overlapped with each other in a direction parallel to the optical axis.

2. The camera device as claimed in claim 1, wherein the dimensions of the deforming member are less than the dimensions of the liquid lens.

3. The camera device as claimed in claim 1, wherein the deforming member has an annular structure.

4. The camera device as claimed in claim 1, wherein the camera device further comprises a fixed portion and a movable portion, wherein the liquid lens is disposed on the fixed portion, and the first electromagnetic driving member and the second electromagnetic driving member are respectively disposed on the fixed portion and the movable portion.

5. The camera device as claimed in claim 1, wherein the lower surface of the deforming member is situated on a first plane, and the lower surface of the liquid lens is situated on a second plane, wherein the first driving module can drive the deforming member to rotate and make the first plane and the second plane interlace.

6. The camera device as claimed in claim 5, wherein the first driving module comprises at least two first electromagnetic driving members and at least two second electromagnetic driving members corresponding to the first electromagnetic driving members, and the deforming member is disposed between the first electromagnetic driving members.

7. The camera device as claimed in claim 6, wherein the first electromagnetic driving members are electrically independent.

8. The camera device as claimed in claim 1, wherein the first driving module can drive the deforming member to move along a direction that is perpendicular to the optical axis of the liquid lens relative to the liquid lens.

9. The camera device as claimed in claim 8, wherein the camera device further comprises a fixed portion and at least one suspension structure, the liquid lens is disposed on the fixed portion, and the suspension structure is connected to the fixed portion and the deforming member.

10. The camera device as claimed in claim 1, wherein the camera device further comprises a fixed portion and a second driving module, and the second driving module can drive the liquid lens to move along a direction that is perpendicular to the optical axis of the liquid lens relative to the fixed portion.

11. The camera device as claimed in claim 1, wherein the camera device further comprises a lens module, disposed above or below the liquid lens.

12. The camera device as claimed in claim 11, wherein the deforming member is formed on the lens module.

13. The camera device as claimed in claim 1, wherein the camera device further comprises a reflective structure, and the liquid lens, the deforming member, and the first driving module are disposed on the reflective structure.

14. The camera device as claimed in claim 13, wherein the liquid lens, the deforming member, and the first driving module are disposed on a reflective surface of the reflective structure.

15. The camera device as claimed in claim 13, wherein the reflective structure comprises a prism, and the liquid lens, the deforming member, and the first driving module are disposed on the prism.

16. The camera device as claimed in claim 1, wherein the camera device further comprises another deforming member, and the deforming member and the other deforming member are disposed on opposite sides of the liquid lens.

17. The camera device as claimed in claim 16, wherein the dimensions of the deforming member are different from the dimensions of the other deforming member.

* * * * *